Sept. 4, 1934.  W. J. DAVIS  1,972,330
AIR CONTROLLED BRAKE
Filed July 31, 1930   2 Sheets-Sheet 2
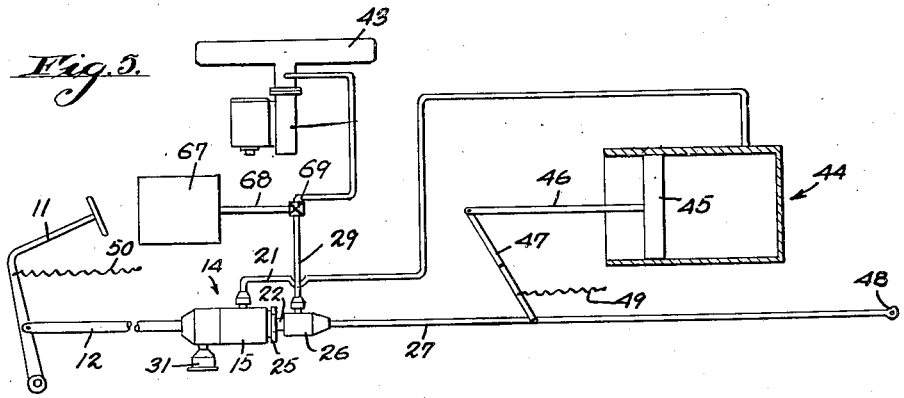
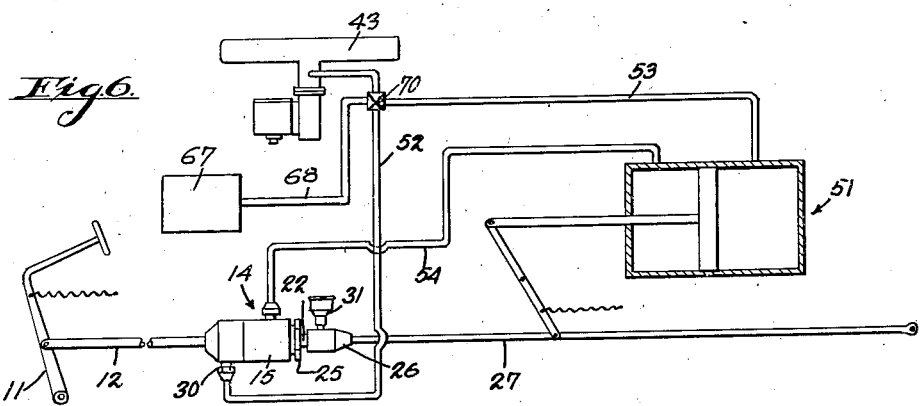
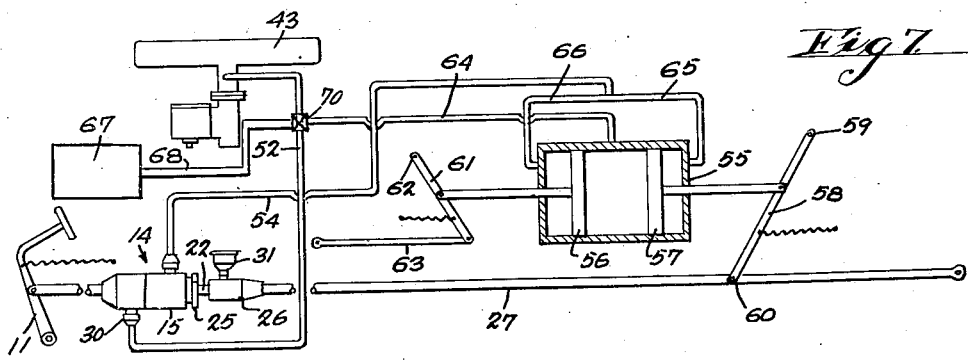
Inventor
Will J. Davis
by
Hazard & Miller
Attorneys

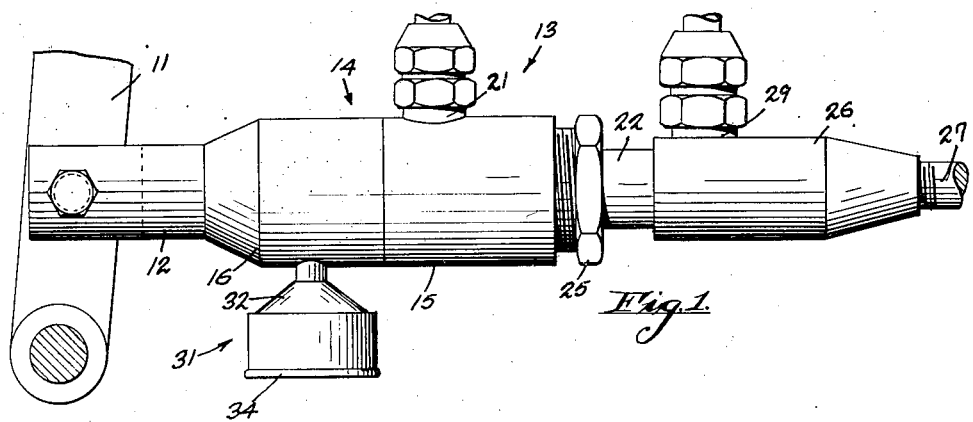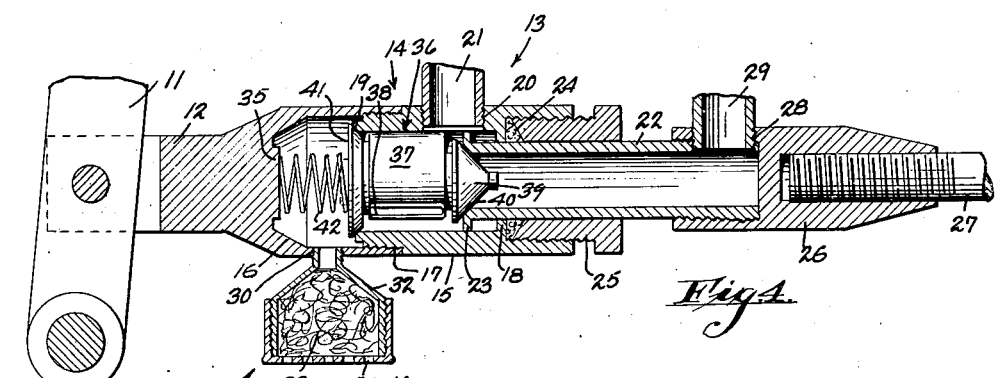

UNITED STATES PATENT OFFICE 1,972,330

AIR CONTROLLED BRAKE

Will J. Davis, Santa Monica, Calif.

Application July 31, 1930, Serial No. 472,056

2 Claims. (Cl. 121—41)

My invention relates to vacuum brakes especially adapted for motor vehicles in which the movement of the brake pedal operates in the ordinary manner, controlling a flow of air under vacuum to apply the brakes and to maintain the brakes set at any desired application, the release of the pedal releasing the brakes.

In this type of control an object of my invention is a simplified construction of control valve coupled with suitable connections to a brake operating cylinder and in which the valve has what may be termed a single moving plunger, such plunger being of a double type and seating on two valve seats.

A further object and feature of my invention in connection with the valve is having the valve body formed in a telescopic manner with an outer housing connected to the brake pedal and with a telescopic inner member connected to a brake rod. The valve plunger operates between a seat on the outer housing or casing member and on the inner telescopic member. The telescopic member is shifted when the brake rod or similar device is actuated by the operating cylinder and functions to cut off the source of vacuum from the cylinder and establish an equalized pressure so that the brakes may be maintained with any desired pressure connecting to the position in which the foot pedal or other lever is moved.

A further object and feature of my invention involves the structure of the valve and the connection to the operating cylinder in which this cylinder is open ended, having the pistons subjected to a vacuum on one side and to atmospheric air pressure on the opposite side, or the cylinder may be closed having the piston subjected to a vacuum on both sides or to atmospheric pressure on one side.

As a further modification I may employ a cylinder having a pair of opposed pistons, the pistons being subject to a vacuum between the pistons and a vacuum or compressed air between the pistons and the head of the cylinder tending to draw the piston into the cylinder.

A further feature and object of my invention relates to a safety connection in which the valve may form an emergency tension device to operate the brake applying rods directly by the foot pedal should the vacuum system fail to operate. In connection with this feature I mount the outer housing and the telescopic member to the brake pedal and the brake rods, and the telescopic member has a limited outward movement and thereby exerts a positive pull on the brake rod at the extreme limit of the movement of the telescopic member outwardly, and thus should the vacuum system fail to operate will operate the brakes by a mechanical connection.

My invention is illustrated in connection with the accompanying drawings, in which:—

Fig. 1 is a side elevation of my valve with one type of connection.

Fig. 2 is a longitudinal section through the valve in the ordinary running position.

Fig. 3 is a similar section of the valve in a position for applying the brakes due to vacuum operation.

Fig. 4 is a similar section showing the valve in a position for maintaining the brakes applied at any desired pressure.

Fig. 5 is a diagrammatic view showing an arrangement for operating the brakes with an open ended cylinder.

Fig. 6 is another diagram of the modified connection with a closed cylinder.

Fig. 7 is a further modified connection showing a single cylinder with opposed pistons.

In the illustrations the brake pedal lever is indicated by the numeral 11 to which is connected a brake lever rod 12. This rod is directly attached to the valve designated generally by the numeral 13. This valve has an outer housing or casing 14 (note particularly Figs. 2, 3, and 4). This outer housing or casing has a cylindrical section 15 with a valve cover or cap 16 secured thereto by threaded connection 17. The cylindrical section has an internal abutment shoulder 18 at one end and at the opposite end there is a conical valve seat 19. The cylindrical section has a port 20 to which is connected a pipe 21, the port and the pipe being designated as the cylinder port and cylinder connection.

The valve has a telescopic tube 22 which is provided with an outwardly extending flange 23, the flange being inside of the cylinder 15 and adapted to engage with the abutment flange 18 of such cylinder. The telescopic tube 22 is engaged by a packing ring 24 held in place by a gland 25, this forming a stuffing box, the gland being threaded to the cylindrical section 15 and thereby forming a vacuum tube seal on the exterior of the telescopic tube 22. This tube has a head 26 preferably screw threaded thereon and to this head there is connected a brake actuating rod 27. The tube 22 has a port 28 to which a pipe 29 may be connected if desired.

The valve cap 16 is provided with a port 30 to which in some cases is connected an air screener 31. This air screener is formed with a cup 32 threaded in the port 30 and having a filling of fibres such as hair or the like with oil indicated at 33 and having a perforated cap 34 to allow flowing of air. The cap 16 is provided with a spring seat 35.

A valve body or plunger designated generally at 36 has a central body section 37 with three outwardly extending ribs 38, these ribs engaging the sides of the cylinder 15 and maintaining the valve centered. There is a sufficient space for circulation of air between the ribs and the body portion 37. At one end of the plunger 36 there is a conical valve surface 39 which is adapted to form a closure with the valve seat 40 formed on the inner end of the telescopic tube 22. The other end of the plunger is provided with an enlarged conical valve surface 41 adapted to bear on the seat 19 at the inner end of the cylinder 15. A compression spring 42 bears against the large end of the plunger and tends to keep this seated on the seat 19.

In the connection shown in Fig. 5 a source of vacuum supply is indicated by the numeral 43, this being indicated as the intake manifold of an engine. The brake applying cylinder is indicated at 44, this cylinder being open at one end and having a piston 45 therein with a piston rod 46 operating a lever 47. The rear end of the brake rod is indicated as having a connecting element 48 for operating the equalizer or other devices for applying the brakes.

It is to be understood that my valve may be used with either the two or the four wheel system of braking. A bracket spring 49 is indicated for retracting the brakes and a retraction spring 50 for retracting the brake pedal lever 11.

In the action of the valve and the connections of Fig. 5 in the normal driving position the plunger 36 occupies the position shown in Fig. 2, in which the plug 39 forms a seal against the seat 40 of the telescoping tube 22, this tube being forced inwardly when the brakes are released. This establishes an air connection through the air filter 31, the chamber in the cap 16, between the plug 41 and the valve seat 19, and by the port 20 in the valve and pipe 21 to the cylinder 44 back of the piston.

In applying the brakes the depression of the foot pedal rocks the pedal lever and this draws the outer housing 14 forward, causing the plug 41 to seat on the valve seat 19. This breaks the connection to atmospheric air and draws the plunger 36 forward, causing the plug 39 to become unseated from the seat 40 as indicated in Fig. 3, and in this first action the telescoping tube 22 with the brake rod 27 remains relatively stationary. This action gives a vacuum connection from the vacuum source 43, through the pipe 29, the port 28, the telescoping tube 22, between the seat 40 and the plug 39, the port 20 and pipe 21 to the cylinder 44. This establishes a vacuum in the cylinder so that the piston is forced inwardly by the atmospheric air pressure. This action rocks the lever 47 and exerts a forward pull on the brake rod. This forward pull on the brake rod shifts the telescoping tube 22 of the valve inwardly until the seat 40 contacts with the plug 39 in the position shown in Fig. 4, and in this action the large plug 41 remains seated on the valve seat 19. This action closes the vacuum connection between the source and the cylinder and also closes the air connection through the air filter 31 and the cylinder. Therefore, the brakes remain applied with a degree of pressure which is regulated by the distance to which the pedal lever 11 has been moved. By this action a person may obtain a light or a heavy application of the brakes or any intermediate degree of pressure may be exerted.

Presuming a light pressure is put on the brakes initially, then by further depression of the foot pedal the connection is opened between the source of vacuum and the cylinder and the brakes applied by the greater degree of pressure.

Releasing the pedal so that it returns to the normal driving position on removal of the foot causes the plunger to be shifted whereby the plug 41 is raised from the seat 19, thus establishing atmospheric air connection to the cylinder, which action releases the brakes.

In the arrangement shown in Fig. 6 I employ a cylinder 51 closed at both ends. There is a vacuum connection 52 from the source to the port 30, and in this arrangement the atmospheric air brake 31 is connected to the port 28 in the sliding tube 22. In this arrangement when the valve is in the driving position of Fig. 2 there is a vacuum connection direct through a pipe 53 to the cylinder on one side of the piston and a vacuum connection through the pipe 52, the port 30, between the plug 41 and the seat 19, to the port 20, and hence by a pipe 54 to the forward end of the cylinder, thus giving an equal vacuum on opposite sides of the piston.

When the brake pedal is depressed and the brake lever pulled forward the movement of the valve housing causes the plunger to be released from the seat 40 and the large plug end 41 to bear on the seat 19. This cuts off the vacuum connection through the pipe 54 to the forward part of the cylinder and establishes an air pressure connection through the air inlet 31 past the seat 40 and plug 39 and by the pipe 54 to the forward end of the cylinder. The air pressure then drives the piston inwardly and exerts a pull on the brake rod 27, thereby applying the brakes.

In the arrangement illustrated in Fig. 7 the connection to the valve is the same as in Fig. 6 but in this case the cylinder 55 is double ended and has pistons 56 and 57 therein, each with a piston rod. The piston 57 is illustrated as having its rod connected to a lever 58 pivoted at 59 and attached to the brake rod 27 at 60. This may be connected to operate the rear wheel brakes. The piston 56 has its rod connected to the lever 61, pivoted at 62 and connected to a brake rod 63 which may operate the front wheel brakes if desired. In this arrangement the pipe 52 has a connection from the source of vacuum to the port 30 in the cap of the valve, thus leading to the forward chamber into the valve. There is a permanently open vacuum connection 64 to the cylinder 55 midway between the pistons. The pipe 54 which leads from the port 20 in the valve housing has two branches 65 and 66 which lead to opposite ends of the cylinder.

In the operation of this connection when the valve is in the running position of Fig. 2 there is a permanent vacuum connection between the pistons and a controlled vacuum connection through the pipe 52, the port 30, past the valve seat 19, the port 20, and the pipes 54, 65, and 66, to opposite ends of the cylinder, thus causing the pistons to be balanced. When the brake pedal and lever is depressed the forward movement of the valve housing causes the large plug 41 of the plunger to close on its seat 19, thus breaking the vacuum connection to the ends of the cylinder and unseat the plug 39 from the seat 40 and thus establish an atmospheric air pressure connection through the air inlet 31, past the seat 40, through the port 20 and the pipes 54, 55, and 56 to the opposite ends of the cylinder. This atmospheric air pressure forces the pistons inwardly and operates the levers 58 and 61 to exert a pull on the brake rods 27 and 63, thus applying the brakes.

My invention as to the valve and to the connections to the brake applying cylinders with the brake connections is equally applicable to a compressed air system of air control of brakes as to the air controlled by a vacuum system.

In Figs. 5, 6, and 7 I have, therefore, illustrated in diagram an alternative construction in which a compressed air tank is indicated by the numeral 67. In each of the figures this is indicated as having a supply pipe 68 connected thereto, and in Fig. 5 there is a valve 69 connecting the pipes 68 and 29. In Figs. 6 and 7 there is a valve 70 connecting the pipes 68 and 53. In Fig. 5 the valve 69 is arranged to either cut off the connection from the vacuum source 43 or from the compressed air source 67 from the valve, and when one of these is cut off the other has a connection to the valve.

In Fig. 6 the valve 70 may make a connection from the vacuum source 43 to the pipes 52 and 53, cutting off the pipe 68, or it may connect the pipes 68, 52, and 53, and shut off the connection to the vacuum source 43. Likewise, in Fig. 7 the valve 70 may occupy the connection through pipes 52 and 64, shutting off pipe 68, or the valve may make the connection from pipe 68 to pipes 52 and 64, shutting off the connection from the vacuum source.

Referring to the compressed air connection using the arrangement shown in Fig. 5, under the normal running condition the valve is in the position of Fig. 2, and atmospheric air connection is made through the pipe 21 to the rear end of the cylinder. When the brake pedal is operated there is a compressed air connection from the source 67, the pipes 68 and 29, through the valve and pipe 21 to the rear end of the cylinder, thus applying the brakes, and the brakes are maintained closed when the valve has both the atmospheric and the compressed air connections closed as illustrated in Fig. 4.

In the connection of Fig. 6 in the normal running of the vehicle with the valve in the position of Fig. 4 there is a compressed air connection from the source 67 through the pipe 68 and 53 to the rear end of the cylinder and through the pipes 68 and 52, the forward part of the valve and pipe 54 to the forward end of the cylinder. When the brakes are applied, this forward end is applied from the atmospheric connection through the intake 51 and the pipe 52, the valve being as indicated in Fig. 3. Thus the compressed air in the rear end of the cylinder actuates the brakes.

In the construction of Fig. 7 in the running with the brakes off, the compressed air connection is from the source 67, pipes 68 and 64, to the center of the cylinder between the two pistons and through the pipes 68 and 52, the front part of the valve and the pipes 54, 65, and 66, to the ends of the cylinder. When the brake is applied there is an atmospheric air connection established from the intake 31 through the rear portion of the valve, the pipes 54, 65, and 66, to the ends of the cylinder, allowing the compressed air between the pistons to force these outwardly and thus actuate the brakes.

In some cases it may be desirable to have a compressed air operation instead of that by evacuated air, and I have, therefore, illustrated alternative constructions which may be operated at will by the operator shifting the valves 69 and 70.

It will be noted by my construction that there are only two valve seats, these being on relatively movable parts of the valve and that there is a common plunger with plugs forming a closure for these seats. On each seat there is an air chamber with a port connecting thereto. One port is in one moving part of the valve and the other port is in the other moving part of the valve, each port being connected to a chamber. These ports may be considered as on the outside of the seat of the part carrying such port. Either of these ports may have a connection to atmospheric air or to a source causing a flow of air to the source, being either a source of vacuum or source of compressed air. The third port 20, which has the connection to the cylinder, and all modifications, may be considered as located between the seats, which is the essential characteristic of this, and so located that there may be an air flow through this connection to the cylinder and either of the seats, such air flow being cut off when both of the seats are closed due to the relative position of both parts of the valve and the plunger.

Various changes may be made in the details of construction without departing from the spirit or scope of the invention as defined by the appended claims.

I claim:

1. In a braking system for vehicles having a brake pedal and a brake-applying rod, a fluid brake control valve, a valve housing having a longitudinal bore therein closed at one end and open at the other end, a tube member telescopically assembled in said bore for movement therein from an inner position, to an intermediate position and to an outer position and having a valve seat formed on the end thereof, stop means preventing outward movement of said tube member beyond said outer position, a fluid passage through said tube member extending from the inner end thereof to a point outside said housing, a valve seat formed in said bore near the closed end thereof and located in longitudinal spaced relation with said tube seat, a valve body freely slidable in said bore, having a valve surface for engaging said bore seat and a second valve surface spaced from said first surface to engage the end of said tube member to close said fluid passage, said surfaces being so spaced as to engage both seats when said tube member is in its intermediate position whereby movement of said tube member to its outer position opens said fluid passage, and movement of said tube member to its inner position moves said valve body away from said bore seat, air ports in said housing, one communicating with said bore between the closed end thereof and said bore seat and the other communicating with said bore between said bore seat and the end of said tube member, bearing means on said valve body between said valve seats for engaging the inner surface of said bore, to slidably support said valve in its bore, means for connecting said housing to a brake control pedal, and means for connecting said tube member directly to said brake-applying rod.

2. In a braking system for vehicles having a brake pedal and a brake-applying rod, a fluid brake control valve, a valve housing having a longitudinal bore therein closed at one end and open at the other end, a tube member telescopically assembled in said bore for movement therein from an inner position, to an intermediate position and to an outer position and having a valve seat formed on the end thereof, stop means preventing outward movement of said tube member beyond said outer position, a fluid passage through said tube member extending from the inner end thereof to a point outside said housing, a valve seat formed in said bore near the closed end thereof and located in longitudinal spaced relation with said tube seat, a sliding valve body having a valve surface upon one of its ends for engaging said bore seat, and a second valve surface upon its opposite end for engaging said tube member to close said fluid passage and having bearing means formed thereon between said valve surfaces for engaging the interior surface of said bore to freely slidably support said body for movement longitudinally of said bore, said valve surfaces being so spaced as to engage both seats when said tube member is in its intermediate position whereby movement of said tube member to its outer position opens said fluid passage, and movement of said tube member to its inner position moves said valve body away from said bore seat, air ports in said housing, one communicating with said bore between the closed end thereof and said bore seat and the other communicating with said bore between said bore seat and the end of said tube member and means for connecting said tube member directly to said brake applying rod.

WILL J. DAVIS.